(12) United States Patent
Backa

(10) Patent No.: US 8,959,658 B2
(45) Date of Patent: *Feb. 17, 2015

(54) SYSTEM AND METHOD FOR POLICY BASED CONTROL OF NAS STORAGE DEVICES

(71) Applicant: Bruce R. Backa, Incline Village, NV (US)

(72) Inventor: Bruce R. Backa, Incline Village, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/015,321

(22) Filed: Aug. 30, 2013

(65) Prior Publication Data

US 2013/0346612 A1  Dec. 26, 2013

Related U.S. Application Data

(63) Continuation of application No. 12/389,050, filed on Feb. 19, 2009, now Pat. No. 8,549,654.

(60) Provisional application No. 61/030,041, filed on Feb. 20, 2008.

(51) Int. Cl.
*H04L 29/06* (2006.01)
*H04L 29/08* (2006.01)
*G06F 17/30* (2006.01)

(52) U.S. Cl.
CPC .......... *H04L 67/1097* (2013.01); *G06F 17/302* (2013.01)
USPC ................................................ 726/27; 726/4

(58) Field of Classification Search
CPC .... H04L 67/1097; H04L 63/10; G06F 17/302
See application file for complete search history.

(56) References Cited

U.S. PATENT DOCUMENTS

| 5,336,705 | A  | 8/1994  | Gorbaty et al. |
| 5,925,695 | A  | 7/1999  | Ohtsuka et al. |
| 6,957,261 | B2 | 10/2005 | Lortz |
| 7,039,827 | B2 | 5/2006  | Meyer et al. |

(Continued)

FOREIGN PATENT DOCUMENTS

| WO | 02/39264 A2 | 5/2002 |
| WO | 02/39695 A2 | 5/2002 |

(Continued)

OTHER PUBLICATIONS

Hu Ming, Zhou Jing-Li and Yu Sheng-sheng; Analysis of disk scheduling model based on NAS devices; Mini-Micro Systems, Sep. 2004, pp. 1578-1581, Issue No. 1000-1220, vol. 25, Issue 9.

(Continued)

*Primary Examiner* — Izunna Okeke
(74) *Attorney, Agent, or Firm* — Sampson & Associates, P.C.

(57) ABSTRACT

A system and method for providing policy-based data management and control on a NAS device deployed on a network and having event enabling framework software. When a user makes a request to store, read, or manipulate data on the NAS device, the NAS device provides an indication of this request to a management tool running on a remote system through the event enabling framework software. The management tool reviews the request in light of its previously established policy-based data storage management configuration and subsequently informs the NAS device, via the event enabling framework software, to either accept or not accept the user's request to store, read or modify data on the NAS device.

4 Claims, 1 Drawing Sheet

(56) References Cited

U.S. PATENT DOCUMENTS

| | | |
|---|---|---|
| 7,082,102 B1 | 7/2006 | Wright |
| 7,194,538 B1 | 3/2007 | Rabe et al. |
| 7,269,612 B2 | 9/2007 | Devarakonda et al. |
| 7,287,063 B2 | 10/2007 | Baldwin et al. |
| 7,464,162 B2 | 12/2008 | Chan |
| 7,506,040 B1 | 3/2009 | Rabe et al. |
| 2002/0129216 A1 | 9/2002 | Collins |
| 2003/0055972 A1 | 3/2003 | Fuller et al. |
| 2003/0105830 A1 | 6/2003 | Pham et al. |
| 2004/0153481 A1 | 8/2004 | Talluri |
| 2004/0221118 A1* | 11/2004 | Slater et al. .................. 711/163 |
| 2004/0243699 A1 | 12/2004 | Koclanes et al. |
| 2005/0021657 A1* | 1/2005 | Negishi et al. ................ 709/213 |
| 2005/0203910 A1 | 9/2005 | Taguchi et al. |
| 2005/0251522 A1 | 11/2005 | Clark |
| 2006/0010150 A1 | 1/2006 | Shaath et al. |
| 2006/0010154 A1 | 1/2006 | Prahlad et al. |
| 2006/0069665 A1 | 3/2006 | Yamakawa et al. |
| 2006/0136516 A1 | 6/2006 | Jain et al. |
| 2006/0174003 A1 | 8/2006 | Wilson et al. |
| 2006/0271596 A1 | 11/2006 | Sabsevitz et al. |
| 2006/0271677 A1 | 11/2006 | Mercier |
| 2006/0294238 A1 | 12/2006 | Naik et al. |
| 2007/0094378 A1 | 4/2007 | Baldwin et al. |
| 2007/0094471 A1 | 4/2007 | Shaath et al. |
| 2007/0156696 A1 | 7/2007 | Lim |
| 2007/0244939 A1 | 10/2007 | Devarakonda et al. |
| 2007/0288247 A1 | 12/2007 | Mackay |
| 2008/0005359 A1 | 1/2008 | Khosravi et al. |
| 2008/0040773 A1 | 2/2008 | Albadarin et al. |
| 2008/0066150 A1 | 3/2008 | Lim |
| 2008/0134175 A1 | 6/2008 | Fitzgerald et al. |
| 2008/0216148 A1 | 9/2008 | Bienek et al. |
| 2008/0235168 A1 | 9/2008 | Chan et al. |
| 2009/0030957 A1 | 1/2009 | Manjunath |
| 2009/0171965 A1 | 7/2009 | Backa |
| 2009/0217345 A1 | 8/2009 | Backa |

FOREIGN PATENT DOCUMENTS

| | | |
|---|---|---|
| WO | 2004/081763 | 9/2004 |
| WO | 2004/104739 | 12/2004 |

OTHER PUBLICATIONS

Peter Wang, Managing and Scaling IP SAN, Computer Technology Review, Nov. 2004, pp. 24-25.

Business Wire, AppIQ, OptiFacio, and Silverback Systems Demonstrate High Performance Data Storage at Breakthrough Price Points at Storage Networking World, Fall 2004, New York, Oct. 25, 2004, p. 1.

PR Newswire, FileNet and Decru Team up for Secure Content Management; Joint Solution Protects Data Privacy, Enables User-Selectable Encryption and Security Policies, New York, Jun. 5, 2006.

Busnicess Wire, TeraCloud Launches SpaceNet 3.0 to Enable Strategic Management of all Storage Resources From a Single Point of Control, New York, Mar. 24, 2003, p. 1.

Worldwide Computer Products News, Evault introduces serve for policy-based file archiving, Coventry, Mar. 2, 2006; p. 1.

Hildebrand et al. "Scaling NFSv4 with Parallel File Systems" May 2005, IEEE International Symposium on Cluster Computing and the Grid. vol. 2. pp. 1039-1046.

Macklem "Not Quite NFS, Soft Cache Consistenacy for NFS" 1994. USENIX Winter 1994 Technical Conference. 17 pages.

Srinivasan et al. "Spritely NFS: experiments with cache-consistency protocols" 1989.SOSP '89 Proceedings of the twelfth ACM sysmposium on Operating systems principles. pp. 44-57.

* cited by examiner

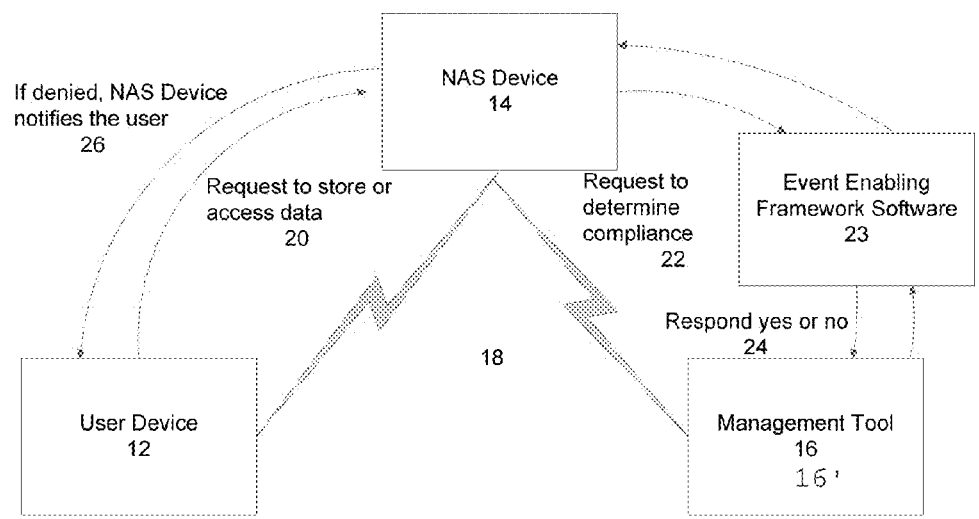

SYSTEM AND METHOD FOR POLICY BASED CONTROL OF NAS STORAGE DEVICES

CROSS REFERENCE TO RELATED APPLICATIONS

This application is a Continuation of U.S. patent application Ser. No. 12/389,050 filed on Feb. 19, 2009 entitled "System and Method for Policy Based Control of NAS Storage Devices", which claims priority to U.S. Provisional Patent Application Ser. No. 61/030,041 filed on Feb. 20, 2008 entitled "System and Method for Policy Based File Blocking and Storage Consumption on NAS Storage Devices" both of which are incorporated fully herein by reference.

TECHNICAL FIELD

The present invention relates to data storage devices and more particularly, relates to a system and method for providing a data management policy for network-attached storage (NAS) devices.

BACKGROUND INFORMATION

A network-attached storage (NAS) device is a server that is dedicated to nothing more than file storing and sharing. A NAS device does not provide any of the activities that a general-purpose server in an application server system typically provides, such as e-mail, authentication or file management. NAS devices allow more hard disk storage space to be added to a network that already utilizes "traditional" servers without affecting other aspects of the network. With a NAS device, storage is not a part of multifunction "server". Instead, in this storage-centric design, the NAS device serves to only store and deliver data to the user. A logical NAS can exist anywhere in a local or wide-area network and can be made up of multiple networked or clustered physical NAS devices.

Unfortunately, experience has shown that the more storage that is attached to a network the more information a user will attempt to store. Storage hardware and data growth continues at a phenomenal rate, consuming more and more of the IT budget. Although storage is relatively inexpensive, it is still a resource that must be managed and the only way to moderate the need to grow data storage and thereby reduce costs is to control what gets on the storage system and its disposition (i.e. retention) once there. Consequently, storage capacity management tools are a critical component to address this runaway growth.

Several companies, such as NTP Software (NTPS), the licensee of the present invention, provide such data storage management tools. NTPS's QFS® software is one such tool that allows system managers to set and enforce policies that control how much storage a user can consume, what types of data they can store, and how long they can keep it. Such policy based data storage management helps lower the cost of data storage and prolongs the life of existing hardware.

There is a class of NAS devices for which third party storage policy management tools can only communicate with this class of NAS's operating system via the NAS vendor's event enabling framework software. This class of NAS devices inherently supports only limited data storage management tools and indeed to date, there is no comprehensive policy based management software available for this class of NAS devices. Further, the single-purpose operating system built into this class of NAS devices does not and cannot support such management software without substantial modifications and requires third party storage policy management software to communicate to the NAS operating system via the NAS vendor's event enabling framework software.

Accordingly, what is needed is a system and method for facilitating the application of a data storage management policy on the class of NAS devices that employ event enabling framework software.

BRIEF DESCRIPTION OF THE DRAWINGS

These and other features and advantages of the present invention will be better understood by reading the following detailed description, taken together with the drawings wherein:

FIG. 1 is block diagram of a system implementing the policy based data storage management system and method of the present invention.

DETAILED DESCRIPTION OF THE PREFERRED EMBODIMENTS

The present invention will be explained in connection with an exemplary system 10, FIG. 1, including a user device 12, a NAS device 14, the NAS device vendor's event enabling framework software 23, and data storage management software, hereafter called "management tool" 16, that serves to manage storage policies on the NAS device 14. The user device 12, NAS device 14 and management tool 16 are coupled together over a local or wide area network by means of a network communication path 18 which may be a wired or wireless network path. The user device 12 may be any form of computing or data processing device requiring access to data stored on the NAS device 14 such as a computer, laptop, PDA or cell phone enabled device or the like. The management tool 16 is preferably implemented as computer software located on a server computer that is a separate machine from the NAS device, and this server machine may also perform other functions and provide other features to the network such as hosting storage reporting and billing software or other network services typically provided by a server. Alternatively, the management tool 16 may also physically reside on or with a NAS device 14, all without limiting the scope of the present invention.

As mentioned above, NAS devices 14 appear as "black boxes" to the network in that they do not have sophisticated processing or decision-making capabilities but rather, simply store data on request and/or provide requested information stored on the device. Accordingly, the present invention provides such management and control over stored data using management tool 16.

In accordance with one aspect of the present invention, the event enabling framework software 23 (not described but well known in the art) of the NAS device 14 is configured such that the management tool 16 will be called or invoked whenever a user device 12 makes a request to the NAS Device 14 to store, read or manipulate data on the NAS device 14. The management tool 16 thereafter will control storing data on the NAS device 14 through the event enabling framework software 23 which typically resides on some machine other than the NAS device 14, or with the policy management tool 16, although this is not a limitation of the present invention since the event enabling framework software 23 may be physically resident on one of multiple locations described herein. EMC CEE framework is an example of an event enabling framework software 23 designed and provided by EMC Corporation of Massachusetts for controlling access to files stored on their EMC brand NAS devices. The "configuration" of the management tool component 16 will be initiated through a process with the event enabling framework software 23 and the NAS device 14. This does not entail loading any software on the NAS device 14. Rather, it entails that after installing the event enabling framework software 23 on a machine, a configuration setting within the event enabling software 23 is set to allow management tool 16, such as NTP Software's QFS to be recognized (registered) by the event enabling framework software 23. This allows the management tool 16 to manage the NAS device 14. Registration encompasses telling the NAS device 14 that the event enabling framework software 23 is to be notified before the NAS device 14 proceeds with certain requests for operations by a user, and telling the event enabling framework software 23 to communicate with the management tool 16 in order to respond back to the NAS device 14 as to whether or not to deny the user request. Examples of these requests for operations are file opens, creates, deletes, renames, and closes. Once the management tool 16 is registered, the NAS device 14 will notify the management tool component 16, via the event enabling framework software 23 each time a user attempts to perform certain operations on a file on the NAS Device 14, such as open a file, modify a file, save a file or the like. For purposes of this application, a "user" includes but is not limited to a human being or a computer software application that needs access to data stored on the NAS device 14. The management tool component 16 must determine whether the user 12 should be allowed access to the file or not and respond appropriately to the NAS Device via the event enabling framework software 23. The event enabling framework software 23 provides the mechanism for the management tool component 16 to interface with NAS device 14 and allow or deny users to store, read, or manipulate data based on compliance with policies established in the management tool by authorized individuals.

Accordingly, when the user 12 issues a request 20 to the NAS device to read, modify or store data, the NAS device 14 determines that this request is one of the pre-configured requests that must be forwarded to the event enabling software 23 first and therefore invokes a call 22 to the event enabling software 23 which in turn issues a call 21 to the management tool 16. The management tool 16 is a policy-based data storage management tool such as the NTP QFS Software described above. The management tool 16 will review the request issued by the user in the form of the call 21 from the event enabling software 23 and provides an indication 24 to the event enabling software 23 which in turn provides an indication to the NAS device 14 as to whether or not the NAS device will be allowed to service the request 20 of the user. If the NAS device cannot service the user request, it will provide an indication 26 to the user 12 that such a request cannot be honored.

From a more technical perspective, the NAS device operating system detects that an action is being taken to store, read, or manipulate data. Because the present invention has been set up to communicate with the NAS device operating system via the event enabling framework software 23 as described above, the management tool 16 which performs the policy-based NAS device management is made aware of the actions that are requested to the NAS device 14, determines if such actions are in compliance with established policies which are stored in a database as part of the management tool 16, then commands the NAS device, via the event enabling software 23, to accept or deny the action requested by the initiating user device 12. These established policies have been previously configured by system administrators via a user interface supplied as part of the management tool 16.

An example of such a policy would be one that in effect stated "John Doe cannot store MP3 type files in directory ABC". When the NAS device 14 denies a user request, it will indicate as such to the user. The management tool can also notify the user along with various other parties via a message in email or other communication mechanisms of the attempt and/or denial. The denial may be based on criteria other than based on the simple identify of the user. For example, it may be that no MP3 files are allowed in a particular folder or that the folder in question has reached its maximum allowable size, a user has been terminated, etc. The elements of a policy can be anything the system can determine.

Accordingly, the present invention facilitates the provision of a robust, well defined, policy based data storage device control over a storage device that would otherwise lack such robust control provided by a robust file policy management tool 16.

Modifications and substitutions by one of ordinary skill in the art are considered to be within the scope of the present invention, which is not to be limited except by the allowed claims and their legal equivalents.

What is claimed is:

1. A system for providing policy-based data management and control of a network attached storage (NAS) device, comprising:
   at least one network attached storage device, coupled to a network and including a data storage device configured for storing data;
   event enabling framework software coupled to said at least one network attached storage device and to a network attached storage device policy based management tool, and configured for receiving user requests from said network attached storage device and for passing said received user requests for access to or storing data on said network attached storage device to a network attached storage device policy based management tool, said network attached storage device policy based management tool configured for determining whether a user request for access to or storing data on said network attached storage device is compliant with one or more established policies, said event enabling framework software responsive to said determination of whether or not said user will be authorized to perform said requested access to or storage of data on said network attached storage device received from said network attached storage device policy based management tool, for providing an indication of said determination to said network attached storage device; and
   a network attached storage device policy based management tool, coupled to said network and to said event enabling framework software and operating on a device other than said at least one network attached storage device, and having one or more configurable parameters defining said one or more established policies, for controlling user access to and storing data on said network attached storage device, and configured for allowing a user to enter said network attached storage device established policies, and responsive to said indication from said event enabling framework software of a user requesting to access or to store data on said network attached storage device, for providing an indication to said event enabling framework software of whether or not said user is authorized to perform said requested access to or storage of data on said network attached storage device.

2. The system of claim 1, wherein said network attached storage device event enabling framework software is responsive to an indication from said network attached storage device policy based management tool that said user is not authorized to perform said requested access to or storage of data on said network attached storage device, and for providing said indication to network attached storage device for providing said indication to said requesting user.

3. A system for providing policy-based data management and control of a network attached storage (NAS) device, comprising:
- at least one network attached storage device, coupled to a network and including a data storage device configured for storing data;
- event enabling framework software coupled to said at least one network attached storage device and to a network attached storage device policy based management tool, and configured for receiving user requests from said network attached storage device and for passing said received user requests for access to or storing data on said network attached storage device to a network attached storage device policy based management tool, said network attached storage device policy based management tool configured for determining whether a user request for access to or storing data on said network attached storage device is compliant with one or more established policies, said event enabling framework software responsive to said determination of whether or not said user will be authorized to perform said requested access to or storage of data on said network attached storage device received from said network attached storage device policy based management tool, for providing an indication of said determination to said network attached storage device; and
- a network attached storage device policy based management tool, coupled to said network and to said event enabling framework software and operating on a device other than said at least one network attached storage device, said network attached storage device policy based management tool configured for receiving one or more configurable parameters of said network attached storage device defining said one or more established policies, said one or more configurable parameters for controlling user access to and storing data on said network attached storage device, said network attached storage device policy based management tool configured for allowing a user to enter said one or more configurable parameters for said network attached storage device, and responsive to said indication from said event enabling framework software of a user requesting to access or to store data on said network attached storage device, for providing an indication to said event enabling framework software of said network attached storage device of whether or not said user is authorized to perform said requested access to or storage of data on said network attached storage device.

4. A method for providing policy-based data management and control of a network attached storage device utilizing the system of claim 1, comprising the acts of:
- receiving, by said network attached storage device policy based management tool, system administrator entered network attached device policies, and responsive to said entered network attached device policies, for providing at least one network attached storage device configurable parameters;
- receiving, by said network attached storage device from said network attached storage device policy based management tool, said configurable parameter configuring said event enabling framework software such that it must provide an indication when a user is requesting access to or the storage of data on said network attached storage device;
- receiving, by said network attached storage device, a request by a user to access or store data on said network attached storage device;
- responsive to receiving said user request, said event enabling framework software providing an indication to said network attached storage device policy based management tool that a user is requesting to access or store data on said network attached storage device;
- responsive to said indication to said network attached storage device policy based management tool, determining, by said network attached storage device policy based management tool, whether said user is authorized to perform said request to access or stored data on said network attached storage device, and providing said indication to said network attached storage device event enabling framework software; and
- responsive to said indication from said network attached storage device policy based management tool, said network attached storage device event enabling framework software allowing said user to access or store data on said network attached storage device if said indication is positive and if said indication is negative, refusing to allow said user to access or stored data on said network attached storage device and providing said indication to said requesting user.

* * * * *

UNITED STATES PATENT AND TRADEMARK OFFICE
CERTIFICATE OF CORRECTION

PATENT NO.        : 8,959,658 B2
APPLICATION NO.   : 14/015321
DATED             : February 17, 2015
INVENTOR(S)       : Bruce R. Backa It is certified that error appears in the above-identified patent and that said Letters Patent is hereby corrected as shown below:

In the Claims

Column 6, Line 35, the word "stored" should read --store--.

Column 6, Line 45, the word "stored" should read --store--.

Signed and Sealed this
Eleventh Day of August, 2015

Michelle K. Lee
*Director of the United States Patent and Trademark Office*